United States Patent
Park et al.

(10) Patent No.: US 11,281,590 B2
(45) Date of Patent: Mar. 22, 2022

(54) CONTROLLER, OPERATING METHOD THEREOF AND STORAGE DEVICE INCLUDING THE SAME

(71) Applicant: SK hynix Inc., Icheon (KR)

(72) Inventors: Byeong Gyu Park, Seongnam (KR); Young Ick Cho, Seoul (KR)

(73) Assignee: SK hynix Inc., Icheon (KR)

( * ) Notice: Subject to any disclaimer, the term of this patent is extended or adjusted under 35 U.S.C. 154(b) by 66 days.

(21) Appl. No.: 16/696,697

(22) Filed: Nov. 26, 2019

(65) Prior Publication Data

US 2021/0042232 A1 Feb. 11, 2021

(30) Foreign Application Priority Data

Aug. 5, 2019 (KR) .................. 10-2019-0094835

(51) Int. Cl.
*G06F 12/00* (2006.01)
*G06F 12/0873* (2016.01)
*G06F 9/54* (2006.01)
*G06F 12/02* (2006.01)

(52) U.S. Cl.
CPC .......... *G06F 12/0873* (2013.01); *G06F 9/544* (2013.01); *G06F 12/0246* (2013.01); *G06F 2212/202* (2013.01)

(58) Field of Classification Search
CPC .. G06F 12/0873; G06F 9/544; G06F 12/0246; G06F 2212/202
See application file for complete search history.

(56) References Cited

U.S. PATENT DOCUMENTS

| | | | | |
|---|---|---|---|---|
| 6,651,132 | B1 * | 11/2003 | Traut ..................... | G06F 12/10 711/6 |
| 8,194,340 | B1 * | 6/2012 | Boyle ..................... | G11B 5/09 360/48 |
| 9,208,823 | B2 * | 12/2015 | Na ..................... | G11B 20/1217 |
| 9,594,680 | B1 * | 3/2017 | Bussa .................. | G06F 11/263 |
| 10,817,418 | B2 * | 10/2020 | Lee .................... | G06F 12/0246 |
| 2004/0095589 | A1 * | 5/2004 | Arai ...................... | G06T 11/40 358/1.2 |

(Continued)

FOREIGN PATENT DOCUMENTS

| KR | 101457270 B1 | 10/2014 |
|---|---|---|
| KR | 101465460 B1 | 11/2014 |

(Continued)

*Primary Examiner* — Shawn X Gu
*Assistant Examiner* — Mohammad S Hasan

(57) ABSTRACT

A controller may include a memory configured to store a map update list in which information of map segments whose mapping information is to be updated is registered. The controller may also include an unmap module. The unmap module may, in response to receiving an unmap command, generate a list information bitmap indicating map segments which are already registered in the map update list, check, using the generate list information bitmap, whether one or more unmap target map segments corresponding to the unmap command overlap the map segments registered in the map update list, using the generate list information bitmap, and selectively register the one or more unmap target map segments into the map update list according to the check result.

19 Claims, 9 Drawing Sheets

(56) References Cited

U.S. PATENT DOCUMENTS

| | | | | |
|---|---|---|---|---|
| 2008/0222352 | A1* | 9/2008 | Booth | H04L 45/7453 |
| | | | | 711/108 |
| 2009/0276604 | A1* | 11/2009 | Baird | G06F 12/0653 |
| | | | | 711/206 |
| 2010/0332787 | A1* | 12/2010 | Grohoski | G06F 12/1027 |
| | | | | 711/207 |
| 2015/0281389 | A1* | 10/2015 | Firsov | G06F 16/282 |
| | | | | 709/214 |
| 2016/0357452 | A1* | 12/2016 | Kadam | G06F 3/0658 |
| 2017/0160933 | A1* | 6/2017 | De Jong | G06F 3/0619 |
| 2017/0371789 | A1* | 12/2017 | Blaner | G06F 12/1009 |
| 2018/0018093 | A1* | 1/2018 | Bradbury | G06F 12/1009 |
| 2019/0004944 | A1* | 1/2019 | Widder | G06F 12/0292 |
| 2019/0129841 | A1* | 5/2019 | Kanno | G06F 3/0679 |
| 2020/0226072 | A1* | 7/2020 | Kang | G06F 12/121 |
| 2020/0264973 | A1* | 8/2020 | Lee | G06F 12/0873 |
| 2021/0026777 | A1* | 1/2021 | Byun | G06F 12/1072 |

FOREIGN PATENT DOCUMENTS

| | | |
|---|---|---|
| KR | 101735065 B1 | 5/2017 |
| KR | 1020200085967 A | 7/2020 |

\* cited by examiner

| Map Segment | Logical Address | Physical Address |
|---|---|---|
| 0 | LBA0 | PBA0 |
|  | LBA1 | PBA1 |
|  | ⋮ | ⋮ |
|  | LBA99 | PBA99 |
| ⋮ | ⋮ | ⋮ |
| M-1 | ⋮ | ⋮ |

L2P

CONTROLLER, OPERATING METHOD THEREOF AND STORAGE DEVICE INCLUDING THE SAME

CROSS-REFERENCES TO RELATED APPLICATION

The present application claims priority under 35 U.S.C. § 119(a) to Korean application number 10-2019-0094835, filed on Aug. 5, 2019, in the Korean Intellectual Property Office, which is incorporated herein by reference in its entirety.

BACKGROUND

1. Technical Field

Various embodiments generally relate to an electronic device, and more particularly, to a controller, an operating method thereof and a storage device including the same.

2. Related Art

Recently, the paradigm for the computing environment has changed to the ubiquitous computing environment in which computer systems can be used anytime and anywhere. Therefore, the use of portable electronic devices such as mobile phones, digital cameras and notebook computers has rapidly increased. Such portable electronic devices generally use a storage device using a memory device, and in particular a non-volatile memory device. The storage device is used to store data which are used in the portable electronic devices.

Since a storage device using a memory device has no mechanical driver, the storage device has excellent stability and durability, high information access speed, and low power consumption. The storage device having such advantages includes a universal serial bus (USB) memory device, a memory card having various interfaces, a universal flash storage (UFS) device, and a solid state drive (SSD).

SUMMARY

Various embodiments are directed to a controller capable of improving the performance of an unmap operation, an operating method thereof, and a storage device including the same.

In an embodiment, a controller may include: a memory configured to store a map update list in which information of map segments whose mapping information is to be updated is registered; and an unmap module configured to generate a list information bitmap indicating map segments which are already registered in the map update list, check whether one or more unmap target map segments overlap the map segments registered in the map update list, using the generate list information bitmap, and selectively register the one or more unmap target map segments into the map update list, according to the check result.

In an embodiment, an operating method of a controller may include: receiving an unmap command having one or more unmap target logical addresses from a host; generating a list information bitmap based on a map update list in which map segments whose mapping information is to be updated are already registered; checking, using the generated list information bitmap, whether one or more unmap target map segments related to the one or more unmap target logical addresses overlaps the map segments registered in the map update list; and selectively registering the one or more unmap target map segments into the map update list according to the check result.

In an embodiment, a storage device may include: a nonvolatile memory; a memory configured to store a map update list in which information regarding map segments whose mapping information is to be updated is registered; and a controller configured to control an operation of the nonvolatile memory. The controller may be configured to generate a list information bitmap indicating map segments registered in the map update list, check, using the generated list information bitmap, whether one or more unmap target map segments overlap the map segments registered in the map update list, and selectively register the one or more unmap target map segments into the map update list, according to the check result.

DETAILED DESCRIPTION

Hereinafter, a controller, an operating process thereof, and a storage device including the controller according to the present disclosure will be described below with reference to the accompanying drawings through illustrative embodiments.

Figure 1:
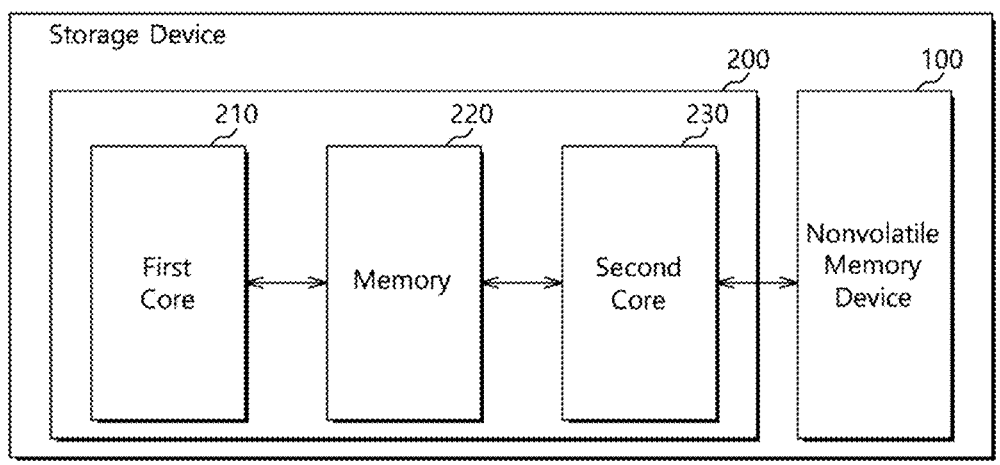
FIG. 1 is a diagram of a storage device in accordance with an embodiment.

FIG. 1 illustrates a configuration of a storage device 10 in accordance with an embodiment.

Referring to FIG. 1, the storage device 10 in accordance with the present embodiment may store data accessed by a host (not illustrated) such as a mobile phone, MP3 player, laptop computer, desktop computer, game machine, TV or in-vehicle infotainment system. The storage device 10 may be referred to as a memory system.

The storage device 10 may be configured as any one of various types of storage devices, depending on an interface protocol coupled to the host. For example, the storage device 10 may be configured as any one of various types of storage devices which include an SSD (Solid State Drive), an MMC (Multi-Media Card) such as an eMMC, RS-MMC or micro-MMC, an SD (Secure Digital) card such as a mini-SD or micro-SD, a USB (Universal Serial Bus) storage device, a UFS (Universal Flash Storage) device, a PCMCIA (Personal Computer Memory Card International Association) card-type storage device, a PCI (Peripheral Component Interconnection) card-type storage device, a PCI-e (PCI Express) card-type storage device, a CF (Compact Flash) card, a smart media card and a memory stick.

The storage device 10 may be fabricated as any one of various types of packages. For example, the storage device 10 may be fabricated as any one of various types of packages such as a POP (Package-On-Package), SIP (System-In-Package), SOC (System-On-Chip), MCP (Multi-Chip Package), COB (Chip-On-Board), WFP (Wafer-Level Fabricated Package) and WSP (Wafer-Level Stack Package).

The storage device 10 may include a nonvolatile memory 100 and a controller 200.

The nonvolatile memory 100 may operate as a data storage medium of the storage device 10. The nonvolatile memory 100 may include any of various types of nonvolatile memories such as a NAND flash memory, NOR flash memory, FRAM (Ferroelectric Random Access Memory) using a ferroelectric capacitor, MRAM (Magnetic Random Access Memory) using a TMR (Tunneling Magneto-Resistive) layer, PRAM (Phase Change Random Access Memory) using chalcogenide alloys, and ReRAM (Resistive Random Access Memory) using transition metal oxide, and the like, depending on the memory cells used in the nonvolatile memory 100.

FIG. 1 illustrates the nonvolatile memory 100 as one block, but the nonvolatile memory 100 may include a plurality of memory chips or dies. The present embodiment may be applied in the same manner to the storage device 10 including the nonvolatile memory 100 constituted by the plurality of memory chips.

The nonvolatile memory 100 may include a memory cell array (not illustrated) having a plurality of memory cells arranged at the respective intersections between a plurality of bit lines (not illustrated) and a plurality of word lines (not illustrated). The memory cell array may include a plurality of memory blocks, and each of the memory blocks may include a plurality of pages.

In embodiments, each memory cell of the memory cell array may be configured as a single level cell (SLC) for storing 1-bit data therein, a multi-level cell (MLC) for storing 2-bit data therein, a triple level cell (TLC) for storing 3-bit data therein, or a quadruple level cell (QLC) for storing 4-bit data therein. The memory cell array 110 may include one or more of the SLC, the MLC, the TLC and the QLC. In embodiments, the memory cell array may include memory cells with a two-dimensional horizontal structure or memory cells with a three-dimensional vertical structure.

The controller 200 may control overall operations of the storage device 10. The controller 200 may process a command or request received from the host. The controller 200 may generate control signals for controlling an operation of the nonvolatile memory 100 in response to the command received from the host, and provide the generated control signals to the nonvolatile memory 100. Referring back to FIG. 1, the controller 200 may include a first core 210, a memory 220 and a second core 230.

The first core 210 may be configured to interface the host with the storage device 10 in response to a protocol of the host. Thus, the first core 210 may be referred to as a protocol core or a host interface layer (HIL). For example, the first core 210 may communicate with the host through any one protocol of USB (Universal Serial Bus), UFS (Universal Flash Storage), MMC (Multimedia Card), PATA (Parallel Advanced Technology Attachment), SATA (Serial Advanced Technology Attachment), SCSI (Small Computer System Interface), SAS (Serial Attached SCSI), PCI (Peripheral Component Interconnection), PCI-e (PCI express), and the like.

The first core 210 may include a micro control unit (MCU) and/or a central processing unit (CPU). The first core 210 may receive commands transferred from the host, and provide the received commands to the second core 230.

Figure 2:
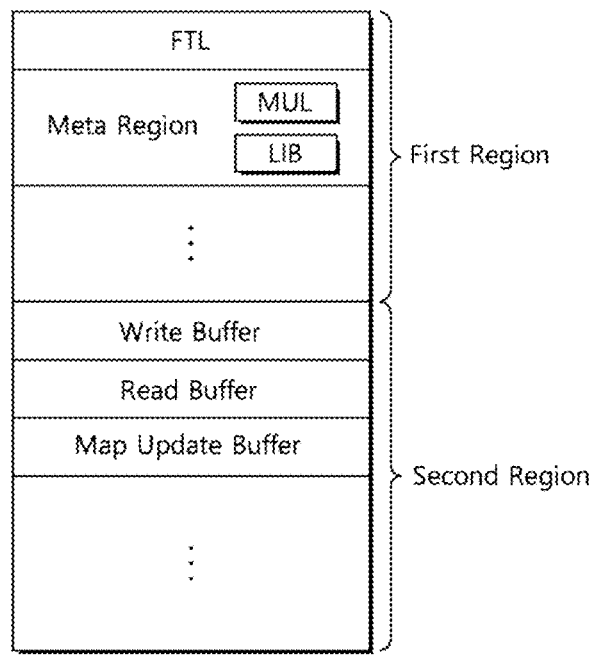
FIG. 2 is a diagram of a memory of FIG. 1.

The first core 210 may store data (for example, write data) received from the host in a write buffer of the memory 220 (see FIG. 2). For this operation, the controller 200 may further include a separate data transfer block (not illustrated) for transferring the data received from the host to the write buffer of the memory 220. For example, according to a control signal received from the first core 210, the data transfer block may receive data from the host and store the received data in the write buffer of the memory 220.

The first core 210 may transfer data (for example, read data) stored in a read buffer (see FIG. 2) of the memory 220 to the host. For example, according to the control signal received from the first core 210, the data transfer block may read the data stored in the read buffer of the memory 220 and transfer the read data to the host.

An unmap command (which may also be called a trim command) allows a host using the storage device 10 to indicate that one or more logical blocks of data in the storage device 10 are no longer considered in use, indicating that the data in those logical blocks may be discarded. When the unmap command is received from the host, the first core 210 may queue the unmap command into an unmap command queue included in a command queue (not illustrated) allocated within the memory 220. However, embodiments are not limited thereto.

Although not illustrated in FIG. 1, the first core 210 may include a dedicated memory therein. The dedicated memory of the first core 210 may be a RAM such as a static RAM (SRAM), but embodiments are not limited thereto.

The memory 220 may be configured as a RAM such as an SRAM or a dynamic RAM (DRAM), but embodiments are not limited thereto. FIG. 1 illustrates that the memory 220 is included in the controller 200, but the memory 220 may be disposed outside the controller 200.

The memory 220 may be physically and electrically coupled to the first and second cores 210 and 230. The memory 220 may store the firmware executed by the second core 230. Furthermore, the memory 220 may store data required for executing the firmware, for example, metadata. That is, the memory 220 may operate as a working memory of the second core 230.

The memory 220 may include a buffer for temporarily storing write data to be transferred to the nonvolatile memory 100 from the host or read data to be transferred to the host from the nonvolatile memory 100. That is, the memory 220 may operate as a buffer memory. The internal configuration of the memory 220 will be described in detail with reference to FIG. 2.

The second core 230 may control overall operations of the storage device 10 by executing firmware or software loaded into the memory 220. The second core 230 may decode and execute a code-based instruction or algorithm such as firmware or software. Therefore, the second core 230 may also be referred to as an FTL (Flash Translation Layer) or FTL core. The second core 230 may include a micro control unit (MCU) and/or a central processing unit (CPU).

The second core 230 may generate control signals for controlling an operation of the nonvolatile memory 100 based on a command provided by the first core 210, and provide the generated control signals to the nonvolatile memory 100. The control signals may include a command, an address, an operation control signal and the like for controlling the nonvolatile memory 100. The second core 230 may provide write data temporarily stored in the memory 220 to the nonvolatile memory 100, or receive read data from the nonvolatile memory 100.

Although not illustrated in FIG. 1, the second core 230 may include a dedicated memory therein. The dedicated memory of the second core 230 may be a RAM such as an SRAM, but embodiments are not limited thereto.

FIG. 2 is a diagram illustrating the memory 220 of FIG. 1.

Referring to FIG. 2, the memory 220 in accordance with the present embodiment may be roughly divided into a first region and a second region, but the present embodiment is not specifically limited thereto. For example, the first region of the memory 220 may store software (or firmware) analyzed and executed by the second core 230 and metadata required for the second core 230 to perform computing and processing operations. The first region of the memory 220 may also store commands received from the host.

For example, the software stored in the first region of the memory 220 may be a FTL. The FTL may be executed by the second core 230, and the second core 230 may execute the FTL to control a unique operation of the nonvolatile memory 100 and to provide device compatibility to the host. As the FTL is executed, the host may recognize and use the storage device 10 as a general storage device such as a hard disk.

Firmware and data of the FTL may be stored in a system region (not illustrated) of the nonvolatile memory 100. When the storage device 10 is powered on, the firmware and data of the FTL may be read from the system region of the nonvolatile memory 100 and loaded into the first region of the memory 220. In an embodiment, the firmware and data of the FTL may be loaded to the dedicated memory (not illustrated) of the second core 230, instead of the first region of the memory 220. The FTL will be described below with reference to FIG. 3.

The first region of the memory 220 may include a meta region for storing metadata required for driving various modules included in the FTL. The meta region may store a map update list (MUL) configured to register map segments whose mapping information is to be updated during a map update operation. The meta region may further store a list information bitmap (LIB) which is generated, used, and erased by an unmap module UMM (see FIG. 3). The LIB may be configured to show information on the map segments registered in the MUL, and may be generated based on the MUL. The MUL and the LIB will be described below with reference to FIGS. 4 and 5, respectively.

The second region of the memory 220 may include a write buffer, a read buffer, a map update buffer and the like.

The write buffer may be configured to temporarily store write data which was received from the host and is to be transferred to the nonvolatile memory 100. The read buffer may be configured to temporarily store read data which was read from the nonvolatile memory 100 and will be transferred to the host. The map update buffer may be configured to temporarily store a map segment whose mapping information is to be updated.

The first region of the memory 220 may be physically closer to each of the first and second cores 210 and 230 than the second region of the memory 220 is, but embodiments are not limited thereto. When the first region of the memory 220 is located physically close to the first and second cores 210 and 230, the first and second cores 210 and 230 can quickly access the first region of the memory 220. Thus, the command processing speed can be increased to improve the overall performance of the storage device 10.

Figure 3:
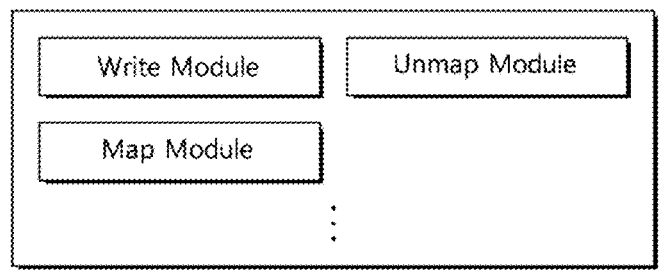
FIG. 3 is a diagram of a flash translation layer (FTL) of FIG. 2.

FIG. 3 illustrates the FTL of FIG. 2.

Referring to FIG. 3, the FTL may include a write module WM, an unmap module UMM and a map module MM. However, embodiment are not limited thereto, and the FTL may also include various modules such as a read module, a garbage collection module, a wear-leveling module, a bad block management module, a power management module, and the like. Each of the modules included in the FTL may be configured as a group of source codes stored on a non-transitory computer-readable media which, when executed by a processor or controller, respectively perform a specific operation or function.

The write module WM may be configured to perform an operation corresponding to a write command received from the host. For example, the write module WM may perform an address mapping operation or address translation operation for mapping or translating a logical address to be written (hereafter referred to as 'write logical address'), which is received with the write command from the host, to a physical address corresponding to an actual position (i.e., specific memory cells) where data is to be stored in the nonvolatile memory 100. The write module WM may register the number of a map segment into the Map Update List (MUL), wherein the map segment includes a logical address mapped to a physical address.

The unmap module UMM may register the number of a map segment into the MUL, the map segment (hereafter, referred to as 'unmap target map segment') corresponding to an unmap command received from the host and a logical address to be unmapped or trimmed (hereafter, referred to as 'unmap target logical address'). When registering the number of the unmap target map segment into the MUL, the unmap module UMM may perform an overlap check operation to determine whether the unmap target map segment is already registered in the MUL. The unmap module UMM may register the number of the corresponding unmap target map segment into the MUL only when the unmap target map segment is not already registered in the MUL.

When the unmap command is received from the host, the unmap module UMM may generate the List Information Bitmap (LIB) (see FIG. 5), and perform the above-described overlap check operation by referring to the generated LIB. When the operation of registering the unmap target map segment into the MUL is completed, the unmap module UMM may delete the LIB from the memory 220. That is, in response to each unmap command received from the host, the unmap module UMM may generate, use, and then delete a LIB.

The map module MM may manage the nonvolatile memory 100 and the memory 220 to perform operations related to map data (such as data of the address map table and the map update buffer). The operations related to the map data may include a map update operation and a map caching operation, but embodiments are not limited thereto.

The map module MM may perform the map update operation based on the MUL stored in the memory 220. For example, when the condition to perform the map update operation is satisfied, the map module MM may check map segments whose mapping information is to be updated by referring to the MUL, read the corresponding map segments from the address mapping table (see FIG. 6) of the nonvolatile memory 100, and store the read map segments in the map update buffer of the memory 220. The map module MM may update mapping information on logical addresses included in the map segments stored in the map update buffer according to the latest mapping information, or trim (or unmap) the mapping information.

Figure 4:
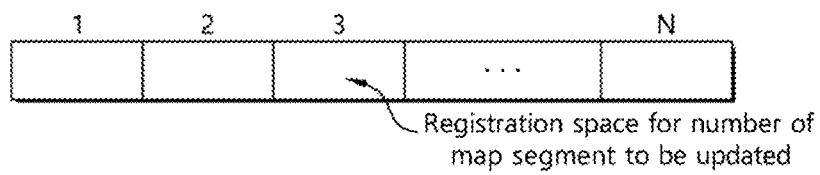
FIG. 4 is a diagram of a map update list (MUL) of FIG. 2.

FIG. 4 illustrates the Map Update List (MUL) of FIG. 2.

Referring to FIG. 4, the MUL may include a plurality of registration spaces 1 to N. Here, N may be a natural number equal to or more than 2. Each of the registration spaces 1 to N may store the number of a map segment to be updated. For example, each of the registration spaces 1 to N may have a size of 2 bytes. However, embodiments are not limited thereto, and the size of the registration space may be decided according to the size of the number of a map segment to be stored. The MUL may be accessed by the write module WM, the unmap module UMM, and the map module MM illustrated in FIG. 3. For example, the write module WM and the unmap module UMM may access the MUL to store the number of a map segment to be updated, and the map module MM may access the MUL to identify map segments to be updated during the map update operation.

Figures 5, 6:
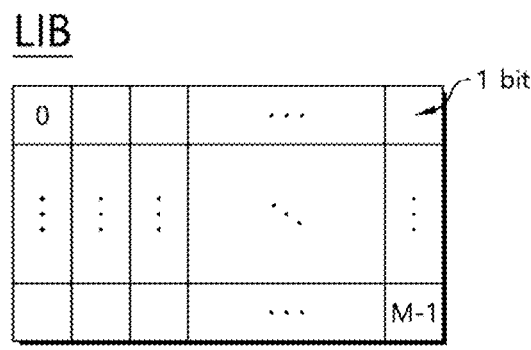
FIG. 5 is a diagram of a list information bitmap (LIB) of FIG. 2.
FIG. 6 is a diagram of an address mapping table.

FIG. 5 illustrates the List Information Bitmap (LIB) of FIG. 2.

Referring to FIG. 5, the LIB may be composed of M bits 0 to M−1. Here, M may be a natural number equal to or more than 2. Furthermore, M may be larger than the number of registration spaces N in the MUL, but embodiments are not limited thereto. In an embodiment, the LIB may include the same number of bits as the number of map segments included in the address mapping table (see FIG. 6). That is, each bit may correspond to a respective map segment.

Each of the M bits 0 to M−1 included in the LIB may be set to a value indicating a 'set' state when the corresponding map segment is present in the MUL, and set to a value indicating a 'reset' state when the corresponding map segment is not present in the MUL. The value indicating the 'set' state may be '1', and the value indicating the 'reset' state may be '0'. However, the present embodiment is not specifically limited thereto. FIG. 5 illustrates the LIB as a two-dimensional array, but embodiments are not limited thereto, and in embodiments, the LIB may be a one-dimensional string of bits.

FIG. 6 illustrates the address mapping table. Although not illustrated in FIG. 1, the address mapping table may be stored in the nonvolatile memory 100.

Referring to FIG. 6, the address mapping table may include a plurality of map segments 0 to M−1. Each of the map segments 0 to M−1 may include a plurality of L2P (Logical address to Physical address) entries. Each of the L2P entries may map one physical address to one logical address.

The logical addresses included in each of the map segments 0 to M−1 may be sorted and fixed in ascending (or descending) order. The physical address mapped to each of the logical addresses may be updated to a physical address corresponding to the latest position assigned to that logical address. A mapping between a logical addresses and a physical addresses may be removed in response to the unmap command received from the host.

FIG. 6 illustrates an address mapping table including M map segments 0 to M−1, wherein each of the M map segments 0 to M−1 includes 100 L2P entries. However, the number of the map segments and the number of the L2P entries in each map segment are not limited thereto.

The map update operation may be performed on a map segment basis. For example, the map update operation may be performed through the following method: when logical addresses whose mapping information is to be updated are LBA1 to LBA30, the logical addresses LBA0 to LBA99 corresponding to the map segment '0' including the logical addresses LBA1 to LBA30 may be all read and stored in the map update buffer of the memory 220, the mapping information of the logical addresses LBA1 to LBA30 among the logical addresses LBA0 to LBA99 may be changed in the map update buffer, and the map segment '0' then written back to the address mapping table in the memory 100. The updating of the mapping information may include changing physical addresses mapped to the respective logical addresses LBA1 to LBA30 into physical addresses corresponding to the latest positions, or unmapping the physical addresses mapped to the logical addresses LBA1 to LBA30.

Figure 7:
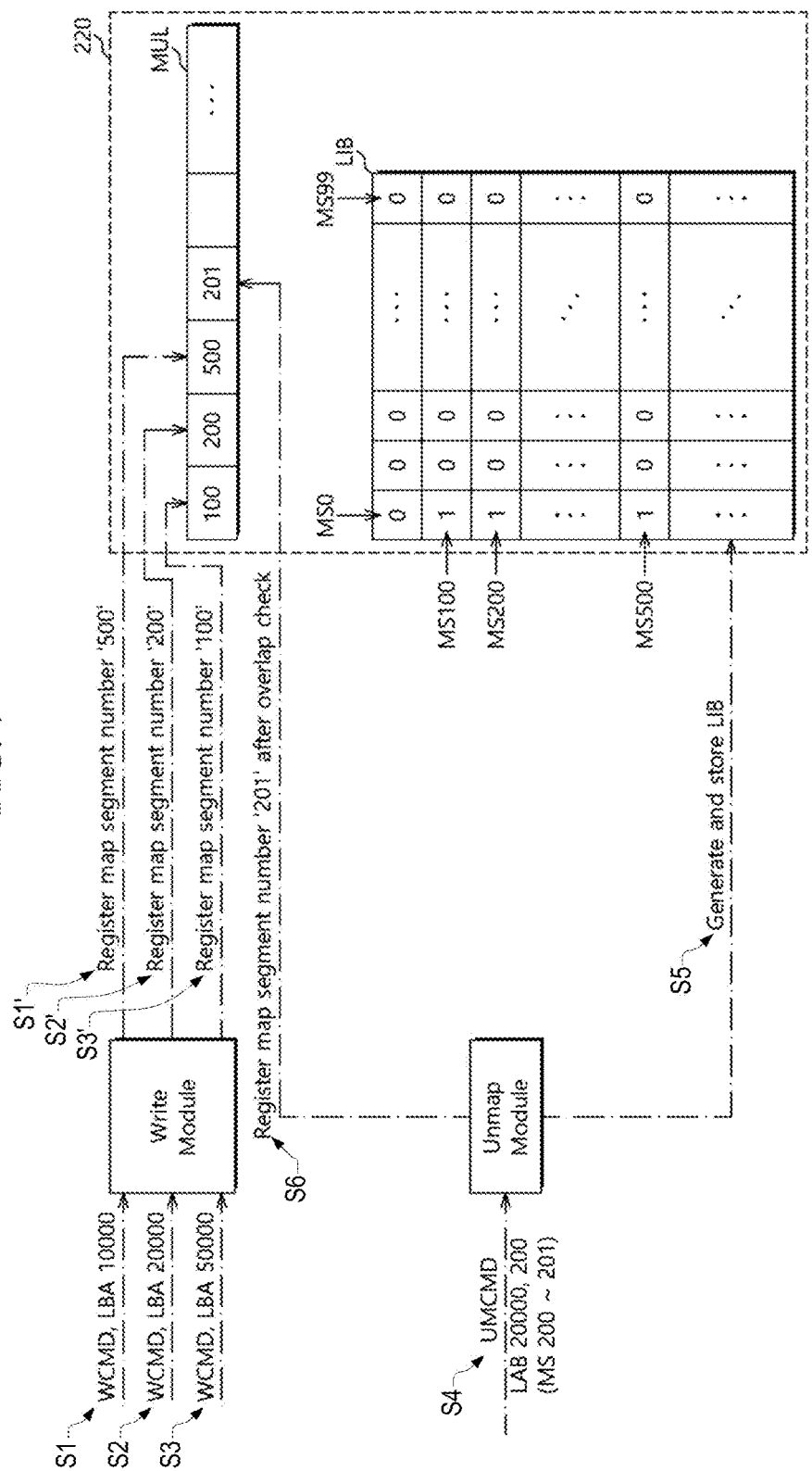
FIG. 7 illustrates a process of registering an unmap target map segment in the MUL in accordance with an embodiment.

FIG. 7 illustrates a process of registering an unmap target map segment into the MUL in accordance with an embodiment.

Referring to FIG. 7, both of the write module WM and the unmap module UMM may access the MUL stored in the memory 220. That is, the write module WM may register or store the number of a map segment including a write logical address into the MUL according to a write command received from the host. Furthermore, the unmap module UMM may register or store the number of an unmap target map segment including an unmap target logical address into the MUL according to an unmap command received from the host.

Specifically, when a write command WCMD and a write logical address LBA 10000 are received from the host (S1), the write module WM may map a physical address to the write logical address LBA 10000, the physical address corresponding to an actual position of the nonvolatile memory 100 where write data are to be stored (not illustrated). Furthermore, the write module WM may register the number of a map segment including the write logical address LBA 10000 (in the example, '100') into the MUL (S1').

Then, when the write command WCMD having a write logical address LBA 20000 and the write command WCMD having a write logical address LBA 50000 are sequentially received from the host (S2 and S3), the write module WM may sequentially map physical addresses of the nonvolatile memory 100 to the write logical addresses LBA 20000 and LBA 50000, respectively. Furthermore, the write module WM may sequentially register the number of a map segment including the write logical address LBA 20000 (in the example, '200') and the number of a map segment including the write logical address 50000 (in the example, '500') into the MUL (S2' and S3').

Then, when the unmap command UMCMD having the unmap target logical address of IBA 20000, 200' is received from the host (S4), the unmap module UMM may generate the LIB by referring to the MUL, and store the generated LIB in the memory 220 (S5). Since the map segments '100', '200' and '500' are registered in the MUL, bits corresponding to the map segments '100', '200' and '500' in the LIB may be set to '1', and the other bits in the LIB may be set to '0'.

In the unmap target logical address, 'LBA 20000' may represent a start logical address, and '200' may represent length information (or size information). That is, the unmap target logical addresses may specify that logical block addresses 20000 to 20199 are to be unmapped, and therefore the unmap target map segments including the unmap target logical addresses may be '200' and '201'.

The unmap module UMM may perform the overlap checking operation for checking whether the unmap target map segments 200 and 201 are present in the MUL, and then register only an unmap target map segment which is not present in the MUL into the MUL (S6). For example, the unmap module UMM may perform the overlap checking operation on the unmap target map segments through a process of checking whether the bits corresponding to the unmap target map segments 200 and 201 in the generated and stored LIB are set to the value indicating the 'set state'.

Since the bit corresponding to the map segment '200' in the LIB is set to '1' as described above, the unmap module UMM may determine that the map segment '200' is present in the MUL, and therefore not register the map segment '200' into the MUL. Furthermore, since the bit corresponding to the map segment '201' in the LIB is set to '0', the unmap module UMM may determine that the map segment '201' is not present in the MUL, and therefore register the map segment '201' into the MUL.

In the present embodiment, the storage device may generate the LIB indicating the map segments which are already registered in the MUL before registering an unmap target map segment related to unmap target logical addresses received from the host into the MUL, and simply check whether the unmap target map segment is registered in the MUL, using the LIB.

Thus, when there are a plurality of unmap target map segments to be registered in the MUL, a process of comparing each of the unmap target map segments to the map segments which are already registered in the MUL is not needed. Thus, the operation of registering the unmap target map segment into the MUL may be rapidly performed.

Figure 8:
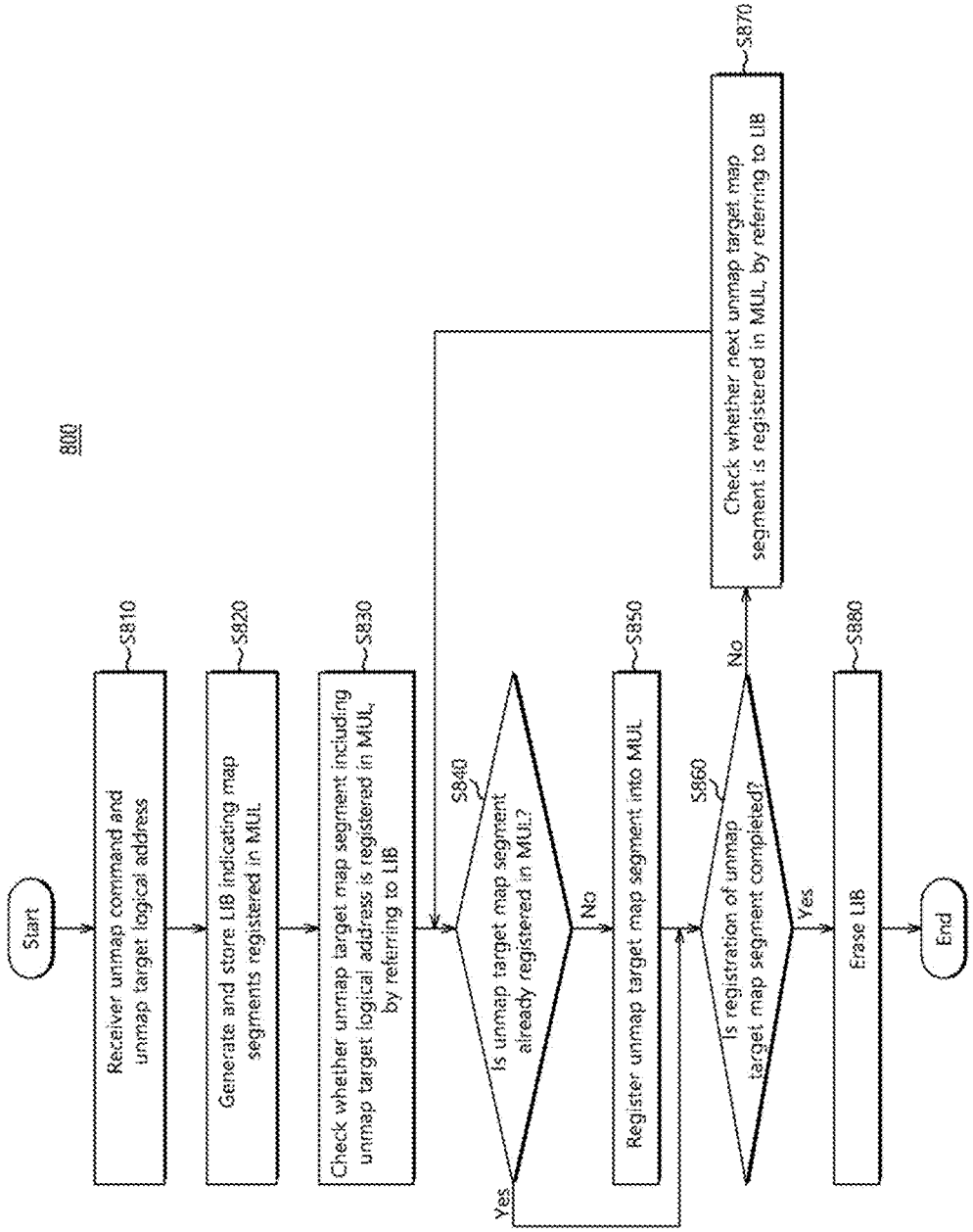
FIG. 8 is a flowchart of an operating process of a controller in accordance with an embodiment.

FIG. 8 is a flowchart illustrating an operating process 800 of the controller 200 in accordance with an embodiment. When the operating process 800 of the controller 200 in accordance with the present embodiment is described with reference to FIG. 8, one or more of FIGS. 1 to 7 may be referred to.

In step S810, the controller 200 may receive an unmap command having an unmap target logical address from the host. The unmap target logical address may include a start logical address and a length.

In step S820, the controller 200 may generate a List Information Bitmap (LIB) indicating which map segments of a memory mapping table are registered in a Map Update List (MUL) stored in the memory 220, and store the generated LIB in the memory 220.

In step S830, the controller 200 may check, using the LIB, whether an unmap target map segment corresponding the unmap target logical address is registered in the MUL.

In step S840, the controller 200 may determine whether the unmap target map segment is already registered in the MUL according to the value of the bit corresponding to the unmap target map segment in the LIB. For example, when the bit corresponding to the unmap target map segment is '1', the controller 200 may determine that the unmap target map segment is registered in the MUL, and the process 800 may proceed to step S860. On the other hand, when the bit corresponding to the unmap target map segment is '0', the controller 200 may determine that the unmap target map segment is not registered in the MUL, and the process 800 may proceed to step S850.

In step S850, the controller 200 may register the unmap target map segment into the MUL. Specifically, the controller 200 may store the number of the unmap target map segment in an available registration space of the MUL.

In step S860, the controller 200 may determine whether the registering of unmap target map segments corresponding to the unmap target logical addresses received from the host is completed. When it is determined that the registering of the unmap target map segments corresponding to the unmap target logical addresses is completed, the process may proceed to step S880. When it is determined that the registering of the unmap target map segments corresponding to the unmap target logical addresses is not completed, the process may proceed to step S870.

In step S870, the controller 200 may check whether the next unmap target map segment is registered in the MUL, by referring to the LIB. Then, the process may proceed to step S840, and steps S840 to S870 may be repeatedly performed for each unmap target map segment in turn until all unmap target map segments corresponding to the unmap target logical addresses received from the host (that is, all map segments having a logical address included in the range of logical addresses specified by the unmap target logical addresses) are registered in the MUL.

In step S880, the controller 200 may erase the LIB stored in the memory 220.

In accordance with the present embodiments, as the time required for checking whether each of the unmap target map segments corresponding to the unmap target logical addresses overlap the map segments registered in the MUL during the process of registering the unmap target map segments into the MUL is significantly reduced, it is possible to improve the performance of the unmap operation.

Furthermore, since the LIB for the MUL generated only by the unmap module is generated, used, and erased, the LIB has no influence on the other modules related to the map update, which makes it possible to lower the possibility that a firmware error will occur.

Figure 9:
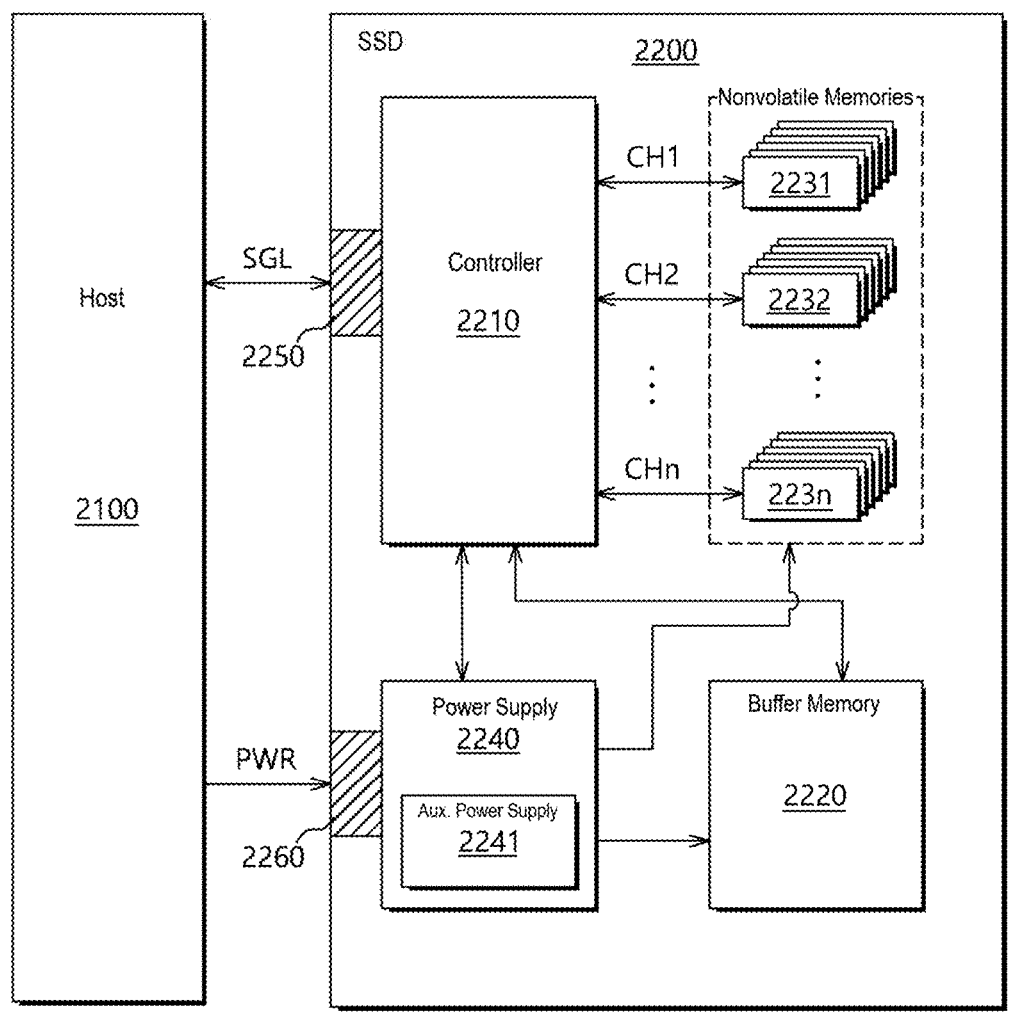
FIG. 9 is a diagram of a data processing system including a solid state drive (SSD) in accordance with an embodiment.

FIG. 9 illustrates a data processing system including a solid state drive (SSD) in accordance with an embodiment. Referring to FIG. 9, a data processing system 2000 may include a host apparatus 2100 and a SSD 2200.

The SSD 2200 may include a controller 2210, a buffer memory device 2220, nonvolatile memory devices 2231 to 223n, a power supply 2240, a signal connector 2250, and a power connector 2260.

The controller 2210 may control an overall operation of the SSD 2220.

The buffer memory device 2220 may temporarily store data to be stored in the nonvolatile memory devices 2231 to 223n. The buffer memory device 2220 may temporarily store data read from the nonvolatile memory devices 2231 to 223n. The data temporarily stored in the buffer memory device 2220 may be transmitted to the host apparatus 2100 or the nonvolatile memory devices 2231 to 223n according to control of the controller 2210.

The nonvolatile memory devices 2231 to 223n may be used as a storage medium of the SSD 2200. The nonvolatile memory devices 2231 to 223n may be coupled to the controller 2210 through a plurality of channels CH1 to CHn. One or more nonvolatile memory devices may be coupled to one channel. The nonvolatile memory devices coupled to the one channel may be coupled to the same signal bus and the same data bus.

The power supply 2240 may provide power PWR input through the power connector 2260 to the inside of the SSD 2200. The power supply 2240 may include an auxiliary power supply 2241. The auxiliary power supply 2241 may supply the power so that the SSD 2200 is normally terminated even when sudden power-off occurs. The auxiliary power supply 2241 may include large capacity capacitors capable of charging the power PWR.

The controller 2210 may exchange a signal SGL with the host apparatus 2100 through the signal connector 2250. The signal SGL may include a command, an address, data, and the like. The signal connector 2250 may be configured of various types of connectors according to an interfacing method between the host apparatus 2100 and the SSD 2200.

Figure 10:
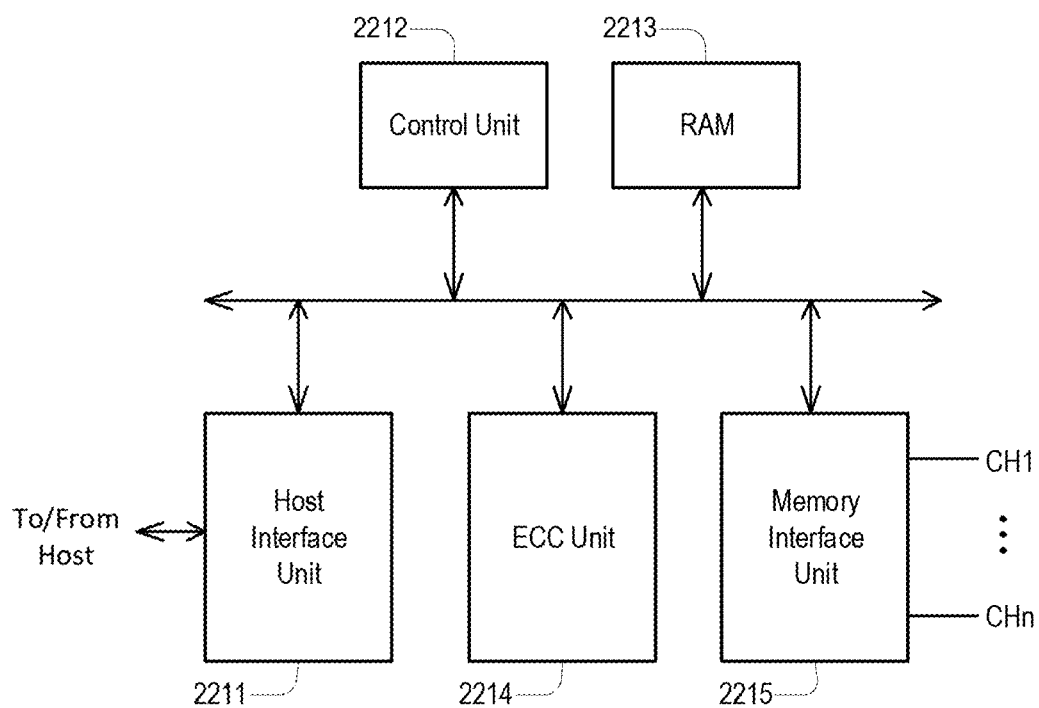
FIG. 10 is a diagram of a controller such as shown in FIG. 9.

FIG. 10 illustrates the controller 2210 of FIG. 9. Referring to FIG. 10, the controller 2210 may include a host interface unit 2211, a control unit 2212, a random access memory (RAM) 2213, an error correction code (ECC) unit 2214, and a memory interface unit 2215.

The host interface unit 2211 may perform interfacing between the host apparatus 2100 and the SSD 2200 according to a protocol of the host apparatus 2100. For example, the host interface unit 2211 may communicate with the host apparatus 2100 through any one among a secure digital protocol, a universal serial bus (USB) protocol, a multimedia card (MMC) protocol, an embedded MMC (eMMC) protocol, a personal computer memory card international association (PCMCIA) protocol, a parallel advanced technology attachment (PATA) protocol, a serial advanced technology attachment (SATA) protocol, a small computer system interface (SCSI) protocol, a serial attached SCSI (SAS) protocol, a peripheral component interconnection (PCI) protocol, a PCI Express (PCI-E) protocol, and a universal flash storage (UFS) protocol. The host interface unit 2211 may perform a disc emulation function that the host apparatus 2100 recognizes the SSD 2200 as a general-purpose data storage apparatus, for example, a hard disc drive HDD.

The control unit 2212 may analyze and process the signal SGL input from the host apparatus 2100. The control unit 2212 may control operations of internal functional blocks according to firmware and/or software for driving the SDD 2200. The RAM 2213 may be operated as a working memory for driving the firmware or software.

The ECC unit 2214 may generate parity data for the data to be transferred to the nonvolatile memory devices 2231 to 223n. The generated parity data may be stored in the nonvolatile memory devices 2231 to 223n together with the data. The ECC unit 2214 may detect errors for data read from the nonvolatile memory devices 2231 to 223n based on the parity data. When detected errors are within a correctable range, the ECC unit 2214 may correct the detected errors.

The memory interface unit 2215 may provide a control signal such as a command and an address to the nonvolatile memory devices 2231 to 223n according to control of the control unit 2212. The memory interface unit 2215 may exchange data with the nonvolatile memory devices 2231 to 223n according to control of the control unit 2212. For example, the memory interface unit 2215 may provide data stored in the buffer memory device 2220 to the nonvolatile memory devices 2231 to 223n or provide data read from the nonvolatile memory devices 2231 to 223n to the buffer memory device 2220.

Figure 11:
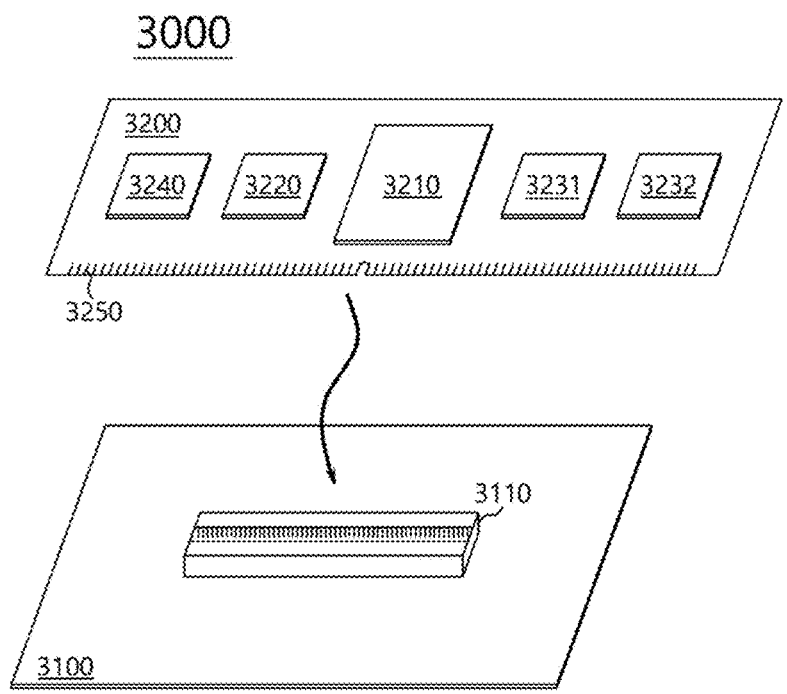
FIG. 11 is a diagram of a data processing system including a data storage apparatus in accordance with an embodiment.

FIG. 11 illustrates a data processing system including a data storage apparatus in accordance with an embodiment. Referring to FIG. 11, a data processing system 3000 may include a host apparatus 3100 and a data storage apparatus 3200.

The host apparatus 3100 may be configured in a board form such as a printed circuit board (PCB). Although not shown in FIG. 11, the host apparatus 3100 may include internal functional blocks configured to perform functions of the host apparatus 3100.

The host apparatus 3100 may include a connection terminal 3110 such as a socket, a slot, or a connector. The data storage apparatus 3200 may be mounted on the connection terminal 3110.

The data storage apparatus 3200 may be configured in a board form such as a PCB. The data storage apparatus 3200 may refer to a memory module or a memory card. The data storage apparatus 3200 may include a controller 3210, a buffer memory device 3220, nonvolatile memory devices 3231 to 3232, a power management integrated circuit (PMIC) 3240, and a connection terminal 3250.

The controller 3210 may control an overall operation of the data storage apparatus 3200. The controller 3210 may be configured to have the same configuration as the controller 2210 illustrated in FIG. 10.

The buffer memory device 3220 may temporarily store data to be stored in the nonvolatile memory devices 3231 and 3232. The buffer memory device 3220 may temporarily store data read from the nonvolatile memory devices 3231 and 3232. The data temporarily stored in the buffer memory device 3220 may be transmitted to the host apparatus 3100 or the nonvolatile memory devices 3231 and 3232 according to control of the controller 3210.

The nonvolatile memory devices 3231 and 3232 may be used as a storage medium of the data storage apparatus 3200.

The PMIC 3240 may provide power input through the connection terminal 3250 to the inside of the data storage apparatus 3200. The PMIC 3240 may manage the power of the data storage apparatus 3200 according to control of the controller 3210.

The connection terminal 3250 may be coupled to the connection terminal 3110 of the host apparatus 3100. A signal such as a command, an address, and data and power may be transmitted between the host apparatus 3100 and the data storage apparatus 3200 through the connection terminal 3250. The connection terminal 3250 may be configured in various forms according to an interfacing method between the host apparatus 3100 and the data storage apparatus 3200. The connection terminal 3250 may be arranged in any one side of the data storage apparatus 3200.

Figure 12:
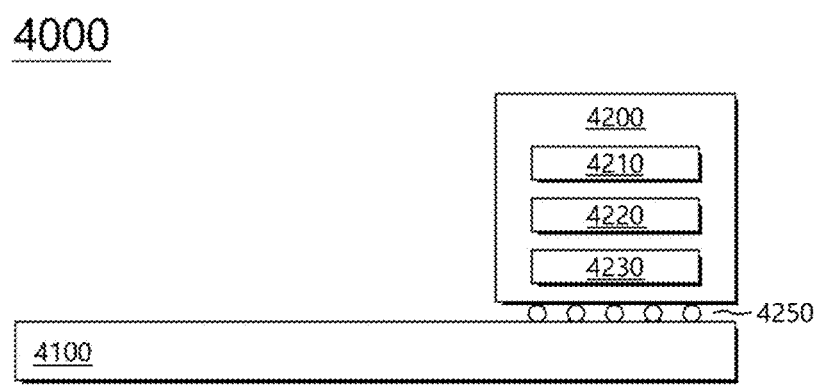
FIG. 12 is a diagram of a data processing system including a data storage apparatus in accordance with an embodiment.

FIG. 12 illustrates a data processing system including a data storage apparatus in accordance with an embodiment. Referring to FIG. 12, a data processing system 4000 may include a host apparatus 4100 and a data storage apparatus 4200.

The host apparatus 4100 may be configured in a board form such as a PCB. Although not shown in FIG. 12, the host apparatus 4100 may include internal functional blocks configured to perform functions of the host apparatus 4100.

The data storage apparatus 4200 may be configured in a surface mounting packaging form. The data storage apparatus 4200 may be mounted on the host apparatus 4100 through a solder ball 4250. The data storage apparatus 4200 may include a controller 4210, a buffer memory device 4220, and a nonvolatile memory device 4230.

The controller 4210 may control an overall operation of the data storage apparatus 4200. The controller 4210 may be configured to have the same configuration as the controller 2210 illustrated in FIG. 10.

The buffer memory device 4220 may temporarily store data to be stored in the nonvolatile memory device 4230. The buffer memory device 4220 may temporarily store data read from the nonvolatile memory device 4230. The data temporarily stored in the buffer memory device 4220 may be transmitted to the host apparatus 4100 or the nonvolatile memory device 4230 through control of the controller 4210.

The nonvolatile memory device 4230 may be used as a storage medium of the data storage apparatus 4200.

Figure 13:
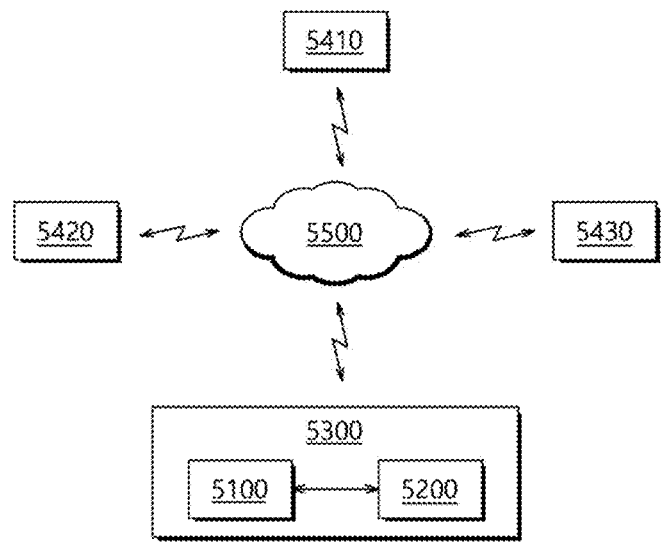
FIG. 13 is a diagram of a network system including a data storage apparatus in accordance with an embodiment.

FIG. 13 illustrates a network system 5000 including a data storage apparatus in accordance with an embodiment. Referring to FIG. 13, the network system 5000 may include a server system 5300 and a plurality of client systems 5410 to 5430 which are coupled through a network 5500.

The server system 5300 may serve data in response to requests of the plurality of client systems 5410 to 5430. For example, the server system 5300 may store data provided from the plurality of client systems 5410 to 5430. In another example, the server system 5300 may provide data to the plurality of client systems 5410 to 5430.

The server system 5300 may include a host apparatus 5100 and a data storage apparatus 5200. The data storage apparatus 5200 may be configured of the storage device 10 of FIG. 1, the SSD 2200 of FIG. 9, the data storage apparatus 3200 of FIG. 11, or the data storage apparatus 4200 of FIG. 12.

Figure 14:
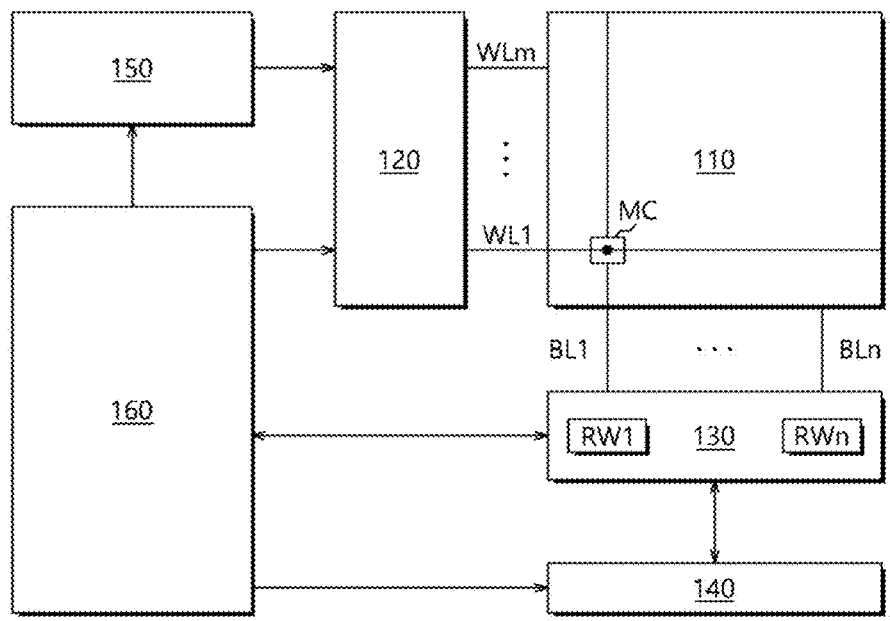
FIG. 14 is a diagram of a nonvolatile memory device included in a data storage apparatus in accordance with an embodiment.

FIG. 14 illustrates a nonvolatile memory device 100 included in a data storage apparatus in accordance with an embodiment. The nonvolatile memory device 100 may include a memory cell array 110, a row decoder 120, a column decoder 140, a data read/write block 130, a voltage generator 150, and a control logic 160.

The memory cell array 110 may include memory cells MC arranged in regions in which word lines WL1 to WLm and bit lines BL1 to BLn cross to each other.

The row decoder 120 may be coupled to the memory cell array 110 through the word lines WL1 to WLm. The row decoder 120 may operate through control of the control logic 160. The row decoder 120 may decode an address provided from an external apparatus (not shown). The row decoder 120 may select and drive the word lines WL1 to WLm based on a decoding result. For example, the row decoder 120 may provide a word line voltage provided from the voltage generator 150 to the word lines WL1 to WLm.

The data read/write block 130 may be coupled to the memory cell array 110 through the bit lines BL1 to BLn. The data read/write block 130 may include read/write circuits RW1 to RWn corresponding to the bit lines BL1 to BLn. The data read/write block 130 may operate according to control of the control logic 160. The data read/write block 130 may operate as a write driver or a sense amplifier according to an operation mode. For example, the data read/write block 130 may operate as the write driver configured to store data provided from an external apparatus in the memory cell array 110 in a write operation. In another example, the data read/write block 130 may operate as the sense amplifier configured to read data from the memory cell array 110 in a read operation.

The column decoder 140 may operate though control of the control logic 160. The column decoder 140 may decode an address provided from an external apparatus (not shown). The column decoder 140 may couple the read/write circuits RW1 to RWn of the data read/write block 130 corresponding to the bit lines BL1 to BLn and data input/output (I/O) lines (or data I/O buffers) based on a decoding result.

The voltage generator 150 may generate voltages used for an internal operation of the nonvolatile memory device 100. The voltages generated through the voltage generator 150 may be applied to the memory cells of the memory cell array 110. For example, a program voltage generated in a program operation may be applied to word lines of memory cells in which the program operation is to be performed. In another example, an erase voltage generated in an erase operation may be applied to well regions of memory cells in which the erase operation is to be performed. In another example, a read voltage generated in a read operation may be applied to word lines of memory cells in which the read operation is to be performed.

The control logic 160 may control an overall operation of the nonvolatile memory device 100 based on a control signal provided from an external apparatus. For example, the control logic 160 may control an operation of the nonvolatile memory device 100 such as a read operation, a write operation, an erase operation of the nonvolatile memory device 100.

While various embodiments have been described above, it will be understood to those skilled in the art that the embodiments described are examples only. Accordingly, the data storage device and the operating method thereof, which have been described herein, should not be limited based on the described embodiments.

What is claimed is:

1. A controller for controlling an operation of a nonvolatile memory, the controller comprising:
   a memory configured to store a map update list in which information of map segments whose mapping information is to be updated is registered; and
   an unmap module configured to:
   generate a list information bitmap indicating map segments which are already registered in the map update list,
   check whether one or more unmap target map segments whose mapping information between a logical address and a physical address is to be removed overlap the map segments registered in the map update list using the generate list information bitmap, and
   selectively register the one or more unmap target map segments into the map update list according to the check result.

2. The controller according to claim 1, wherein the unmap module stores the generated list information bitmap in the memory.

3. The controller according to claim 2, wherein the unmap module erases the list information bitmap from the memory when the registering of the one or more unmap target map segments is completed.

4. The controller according to claim 1, wherein the unmap module is a group of source codes stored in a non-transitory computer-readable media which, when executed by the controller, cause the controller to perform the operations of generating the list information bitmap, checking whether the one or more unmap target map segments overlap the map segments registered in the map update list, and registering the one or more unmap target map segments into the map update list.

5. The controller according to claim 1, wherein the map update list includes N spaces in which the information of the map segments to be updated is registered, where N is a natural number equal to or more than 2.

6. The controller according to claim 5, wherein the list information bitmap includes M bits corresponding to a plurality of map segments, respectively, wherein M is a natural number equal to or more than 2 and is larger than N.

7. An operating method of a controller for controlling an operation of a nonvolatile memory, the operating method comprising:
   receiving an unmap command having one or more unmap target logical addresses whose mapping information to physical addresses is to be removed from a host;

generating a list information bitmap based on a map update list in which map segments whose mapping information is to be updated are already registered;

checking, using the generated list information bitmap, whether one or more unmap target map segments related to the one or more unmap target logical addresses overlaps the map segments registered in the map update list; and selectively registering the one or more unmap target map segments into the map update list according to the check result.

8. The operating method according to claim 7, wherein generating the list information bitmap comprises forming a bitmap in which bits corresponding to the map segments registered in the map update list are set to a first value indicating a 'set' state, and bits corresponding to the other map segments are set to a second value indicating a 'reset' state.

9. The operating method according to claim 8, wherein checking whether the one or more unmap target map segments related to the one or more unmap target logical addresses overlap the map segments registered in the map update list comprises checking whether bits corresponding to the one or more unmap target map segments in the list information bitmap have the first value.

10. The operating method according to claim 7, further comprising erasing the generated list information bitmap when the registering of the one or more unmap target map segments is completed after selectively registering the one or more unmap target map segments in the map update list.

11. A storage device comprising:

a nonvolatile memory;

a memory configured to store a map update list in which information regarding map segments whose mapping information is to be updated is registered; and a controller configured to control an operation of the nonvolatile memory, wherein the controller is configured to:

generate a list information bitmap indicating map segments registered in the map update list, check, using the generated list information bitmap, whether one or more unmap target map segments whose mapping information between a logical address and a physical address is to be removed overlap the map segments registered in the map update list, and selectively register the one or more unmap target map segments into the map update list, according to the check result.

12. The storage device according to claim 11, wherein the controller is configured to generate the list information bitmap in response to receiving an unmap command including one or more unmap target logical addresses from a host.

13. The storage device according to claim 12, wherein the one or more unmap target map segments correspond to map segments including logical addresses of the one or more unmap target logical addresses.

14. The storage device according to claim 11, wherein the controller is configured to store the generated list information bitmap in the memory.

15. The storage device according to claim 14, wherein the controller is configured to erase the list information bitmap from the memory when the registering of the one or more unmap target map segments is completed.

16. The storage device according to claim 11, wherein the map update list is configured to have N spaces in which the information of the map segments to be updated is registered, where N is a natural number equal to or more than 2.

17. The storage device according to claim 16, wherein the list information bitmap comprises M bits respectively corresponding to a plurality of map segments, wherein M is a natural number equal to or more than 2 and is larger than N.

18. The storage device according to claim 11, wherein the controller is configured to generate the list information bitmap by setting bits corresponding to the map segments registered in the map update list to a first value indicating a 'set' state, and setting bits corresponding to the other map segments to a second value indicating a 'reset' state.

19. The storage device according to claim 18, wherein the controller is configured to check whether bits corresponding to the one or more unmap target map segments in the list information bitmap have the first value in order to check whether the one or more unmap target map segments overlap the map segments registered in the map update list.

* * * * *